US011327909B1

(12) United States Patent
Bar-Ilan et al.

(10) Patent No.: US 11,327,909 B1
(45) Date of Patent: May 10, 2022

(54) SYSTEM FOR IMPROVING INPUT / OUTPUT PERFORMANCE

(71) Applicant: MELLANOX TECHNOLOGIES, LTD., Yokneam (IL)

(72) Inventors: Eliav Bar-Ilan, Or Akiva (IL); Oren Duer, Kohav Yair (IL); Amir Ancel, Moran (IL); Yossi Kendel, Kiryat Ata (IL); Idan Burstein, Karmiel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/079,536

(22) Filed: Oct. 26, 2020

(51) Int. Cl.
 *G06F 13/16* (2006.01)
 *G06F 12/123* (2016.01)

(52) U.S. Cl.
 CPC ........ *G06F 13/1668* (2013.01); *G06F 12/124* (2013.01); *G06F 2212/1044* (2013.01)

(58) Field of Classification Search
 None
 See application file for complete search history.

(56) References Cited

U.S. PATENT DOCUMENTS

| | | | |
|---|---|---|---|
| 4,680,703 A | 7/1987 | Kriz | |
| 5,913,226 A | 6/1999 | Sato | |
| 6,490,647 B1 | 12/2002 | Batchelor | |
| 7,409,505 B2 * | 8/2008 | Scott | G06F 12/0813 711/147 |
| 7,721,049 B2 | 5/2010 | Ehrlich | |
| 7,886,182 B1 | 2/2011 | Coatney et al. | |
| 8,429,315 B1 * | 4/2013 | Chudgar | G06F 3/00 710/55 |
| 8,782,348 B2 * | 7/2014 | Eddy | G06F 12/0811 711/146 |
| 9,104,582 B1 | 8/2015 | Mukundan | |
| 9,525,734 B2 | 12/2016 | Izenberg et al. | |
| 9,645,931 B2 | 5/2017 | Cox | |
| 9,645,932 B1 | 5/2017 | Bono | |

(Continued)

OTHER PUBLICATIONS

PCI Express® Base Specification,Revision 3.0, pp. 1-860, Nov. 10, 2010.

(Continued)

*Primary Examiner* — Michael Sun
(74) *Attorney, Agent, or Firm* — Kligler & Associates Patent Attorneys Ltd (57) ABSTRACT

In one embodiment, data communication apparatus includes a network interface including one or more ports for connection to a packet data network and configured to receive content transfer requests from at least one remote device over the network, a storage sub-system to be connected to local peripheral storage devices, and including at least one peripheral interface, and a memory sub-system including a cache and RAM, and processing circuitry to manage transfer of content between the remote device(s) and the local peripheral storage devices via the peripheral interface(s) and the cache, responsively to the content transfer requests, while pacing commencement of serving of respective ones of the content transfer requests responsively to a metric of the storage sub-system so that while ones of the content transfer requests are being served, other ones of the content transfer requests pending serving are queued in at least one pending queue.

23 Claims, 7 Drawing Sheets

(56) References Cited

U.S. PATENT DOCUMENTS

| | | | |
|---|---|---|---|
| 9,678,871 | B2 | 6/2017 | Voigt |
| 9,973,417 | B2* | 5/2018 | Underwood .......... G06F 13/385 |
| 10,042,750 | B2 | 8/2018 | Roberts et al. |
| 10,084,716 | B2 | 9/2018 | Gafni |
| 10,248,610 | B2 | 4/2019 | Menachem et al. |
| 10,303,647 | B2 | 5/2019 | Menachem et al. |
| 10,397,362 | B1* | 8/2019 | Volpe ................. H04L 67/2852 |
| 10,402,091 | B1* | 9/2019 | Vankamamidi ....... G06F 3/0604 |
| 10,664,419 | B2* | 5/2020 | Rico Carro .......... H04L 45/745 |
| 10,733,110 | B1* | 8/2020 | Volpe ..................... G06F 3/0616 |
| 10,776,272 | B2 | 9/2020 | Burstein et al. |
| 2006/0179195 | A1 | 8/2006 | Sharma et al. |
| 2006/0256784 | A1 | 11/2006 | Feng et al. |
| 2006/0259661 | A1 | 11/2006 | Feng et al. |
| 2008/0256183 | A1 | 10/2008 | Flynn et al. |
| 2008/0313364 | A1 | 12/2008 | Flynn et al. |
| 2009/0300660 | A1 | 12/2009 | Solomon et al. |
| 2010/0205367 | A1 | 8/2010 | Ehrlich et al. |
| 2011/0153952 | A1 | 6/2011 | Dixon et al. |
| 2011/0246597 | A1 | 10/2011 | Swanson et al. |
| 2013/0198311 | A1 | 8/2013 | Tamir et al. |
| 2013/0262767 | A1* | 10/2013 | Lih ..................... G06F 12/0897 |
| | | | 711/120 |
| 2014/0195480 | A1 | 7/2014 | Talagala et al. |
| 2014/0258637 | A1 | 9/2014 | Hong et al. |
| 2015/0019903 | A1 | 1/2015 | Arroyo et al. |
| 2015/0067091 | A1 | 3/2015 | Das |
| 2015/0347349 | A1 | 3/2015 | Raindel et al. |
| 2016/0124877 | A1 | 5/2016 | Hefty |
| 2016/0378709 | A1 | 6/2016 | Menachem et al. |
| 2016/0337426 | A1* | 11/2016 | Shribman .......... H04N 21/6125 |
| 2017/0017609 | A1 | 1/2017 | Menachem et al. |
| 2017/0034268 | A1 | 2/2017 | Govind |
| 2019/0236447 | A1 | 8/2019 | Cohen et al. |
| 2021/0344600 | A1* | 11/2021 | Urman .................... H04L 47/30 |

OTHER PUBLICATIONS

NVIDIA Corporation, "NVIDIA GPUDirect", pp. 1-4, year 2015.

InfiniBand TM Architecture Specification vol. 1, Release 1.3, pp. 1-1842, Mar. 3, 2015.

Urman et al., U.S. Appl. No. 16/865,567, filed May 4, 2020.

Wikipedia, "TCP congestion control", pp. 1-15, last updated Oct. 19, 2020 downloaded from https://en.wikipedia.org/wiki/TCP_congestion_control.

Erickson, C., "Congestion Control", notes, pp. 1-6, May 21, 2003 downloaded from http://user.it.uu.se/~carle/Notes/32_CongestionControl.html#:~:text=Flow%20control%20is%20a%20local,and%20transport%20layers%20effect%20congestion.

NVIDIA BlueField-2 Ethernet DPU—User Guide—Introduction, docs.mellanox.com, pp. 1-3, year 2021, as downloaded from docs.mellanox.com/display/BlueField2DPUENUG/Introduction.

"IO Pacing Prototype," Mellanox / spdk, GitHub, Inc., pp. 1-62, Sep. 17, 2020 as downloaded from https://github.com/Mellanox/spdk/tree/io_pacing/io_pacing.

* cited by examiner

Fig. 10

SYSTEM FOR IMPROVING INPUT / OUTPUT PERFORMANCE

FIELD OF THE INVENTION

The present invention relates to computer systems, and in particular, but not exclusively to, improving I/O performance in data communication devices.

BACKGROUND

Solid-state drives (SSDs) are mass-storage devices that use integrated circuit memory, typically NAND-based flash memory, to store data while providing an interface that emulates traditional hard disk drives (HDDs). By comparison with HDDs, SSDs offer faster access, lower latency, and greater resistance to environmental disturbances. Therefore, SSDs are gradually replacing HDDs in many storage applications.

Because SSDs were originally designed to take the place of HDDs, they have generally used the same sorts of input/output (I/O) buses and protocols as HDDs, such as SATA, SAS and Fibre Channel. Subsequently, SSDs have become available that connect directly to the peripheral component interface bus of a host computer, such as the PCI Express® (PCIe®) bus. NVM Express (NVMe) defines a register interface, command set and feature set for PCI Express SSDs.

Advanced network interface controllers (NICs) are designed to support remote direct memory access (RDMA) operations, in which the NIC transfers data by direct memory access from the memory of one computer into that of another without involving the central processing unit (CPU) of the target computer, Although RDMA is generally used to transfer data to and from host memory (RAM), a number of attempts to adapt RDMA functionality for reading and writing data directly to and from an SSD have been described in the patent literature.

For example, U.S. Patent Application Publication 2008/0313364 describes a method for remote direct memory access to a solid-state storage device, which is said to allow direct access between memory of a client connected through a network to such a device. Similarly, U.S. Patent Application Publication 2011/0246597 describes a system in which a network interface component of a server may access a solid-state storage module of the server by a network storage access link that bypasses a central processing unit (CPU) and main memory of the server.

Additionally, smart NICs, such as the Mellanox® Blue-Field®-2 data processing unit, offload critical network, security, and storage tasks from the CPU, for example, by supporting RDMA operations and directly reading or writing to attached storage devices in response to remote initiators requests.

SUMMARY

There is provided in accordance with an embodiment of the present disclosure, a data communication apparatus, including a network interface including one or more ports for connection to a packet data network and configured to receive content transfer requests from at least one remote device over the packet data network via the one or more ports, a storage sub-system configured to be connected to local peripheral storage devices, and including at least one peripheral interface, and a memory sub-system including a cache and a random-access memory (RAM), the memory sub-system being configured to evict overflow from the cache to the RAM, and processing circuitry configured to manage transfer of content between the at least one remote device and the local peripheral storage devices via the at least one peripheral interface and the cache, responsively to the content transfer requests, while pacing commencement of serving of respective ones of the content transfer requests responsively to a metric of the storage sub-system so that while ones of the content transfer requests are being served, other ones of the content transfer requests pending serving are queued in at least one pending queue.

Further in accordance with an embodiment of the present disclosure the processing circuitry is configured to pace the commencement of the serving of the respective content transfer requests responsively to availability of spare data capacity of the cache.

Still further in accordance with an embodiment of the present disclosure the cache has a size, and the processing circuitry is configured to provide data-capacity credits responsively to the size of the cache, and pace the commencement of the serving of the respective content transfer requests responsively to availability of the data-capacity credits.

Additionally in accordance with an embodiment of the present disclosure the processing circuitry is configured to commence serving one of the content transfer requests responsively to one of the data-capacity credits being available, remove the one data-capacity credit from availability responsively to the one content transfer request being currently served, and return the one data-capacity credit to availability responsively to the one content transfer request completing to be served.

Moreover, in accordance with an embodiment of the present disclosure the cache includes respective cache sections, and the processing circuitry is configured to assign respective ones of the data-capacity credits to the respective cache sections so that use of the respective cache sections is limited to availability of respective ones of the data-capacity credits.

Further in accordance with an embodiment of the present disclosure the at leak one pending queue includes different pending queues, and the processing circuitry is configured to allocate the provided data-capacity credits among the different pending queues.

Still further in accordance with an embodiment of the present disclosure the different pending queues includes any one or more of the following a read pending queue and a write pending queue, pending queues for different ones of the local peripheral storage devices, pending queues for different groups of the local peripheral storage devices, pending queues for different peripheral interfaces, pending queues for different content request attributes, or pending queues for different content request initiators.

Additionally, in accordance with an embodiment of the present disclosure the processing circuitry is configured to dynamically reallocate the data-capacity credits among the different pending queues responsively to usage of the data-capacity credits by the different pending queues.

Moreover, in accordance with an embodiment of the present disclosure the at least one peripheral interface includes a plurality of peripheral interfaces, the processing circuitry being configured to pace the commencement of the serving of the respective content transfer requests responsively to data-throughput rates of the respective peripheral interfaces.

Further in accordance with an embodiment of the present disclosure the processing circuitry being configured to pace the commencement of the serving of the respective content transfer requests responsively to the data-throughput rates of the respective peripheral interfaces and the network interface.

Still further in accordance with an embodiment of the present disclosure the processing circuitry is configured to provide data-throughput rate credits responsively to the data throughput rates of the peripheral interfaces, and pace the commencement of the serving of the respective content transfer requests responsively to availability of the data-throughput rate credits.

Additionally, in accordance with an embodiment of the present disclosure the processing circuitry is configured to commence serving one of the content transfer requests responsively to one of the data-throughput rate credits being available, and remove the one data-throughput rate credit from availability responsively to the one content transfer request being currently served.

Moreover, in accordance with an embodiment of the present disclosure the processing circuitry is configured to assign respective ones of the data-throughput rate credits to the respective ones of the peripheral interfaces so that use of the respective peripheral interfaces is limited to availability of respective ones of the data-throughput rate credits.

Further in accordance with an embodiment of the present disclosure the at least one pending queue includes different pending queues, and the processing circuitry is configured to allocate the provided data-throughput rate credits among the different pending queues.

Still further in accordance with an embodiment of the present disclosure the different pending queues includes any one or more of the following a read pending queue and a write pending queue, pending queues for different ones of the local peripheral storage devices, pending queues for different groups of the local peripheral storage devices, pending queues for different ones of the peripheral interfaces, pending queues for different content request attributes, or pending queues for different content request initiators.

Additionally, in accordance with an embodiment of the present disclosure the processing circuitry is configured to allocate the data-throughput rate credits among the different pending queues responsively to actual rates at which the data associated with the content transfer requests in the pending queues is transferred.

Moreover in accordance with an embodiment of the present disclosure the memory sub-system is configured to evict cache entries to the RAM a least recently used (LRU) algorithm wherein a cache entry with a least recently used usage index is first to be evicted from the cache to the RAM by the memory sub-system, responsively to a cache entry being written to the cache, to assign a most recently used usage index to the written cache entry, and responsively to a cache entry being read from the cache, not to amend a usage index of the read cache entry.

Further in accordance with an embodiment of the present disclosure the memory sub-system is configured to evict cache entries to the RAM a least recently used (LRU) algorithm wherein a cache entry with a least recently used usage index is first to be evicted from the cache to the RAM by the memory sub-system, responsively to a cache entry being written to the cache, to assign a most recently used usage index to the written cache entry, and responsively to a cache entry being read from the cache, to amend a usage index of the read cache entry to a less recently used usage index.

Still further in accordance with an embodiment of the present disclosure the memory sub-system is configured to evict cache entries to the RAM a least recently used (LRU) algorithm wherein a cache entry with a least recently used usage index is first to be evicted from the cache to the RAM by the memory sub-system, responsively to a cache entry being written to the cache, to assign a most recently used usage index to the written cache entry, and responsively to a cache entry being read from the cache, to purge the read cache entry from the cache without writing the read cache entry to the RAM.

Additionally, in accordance with an embodiment of the present disclosure the memory sub-system is configured, responsively to a previously evicted data entry being read from the RAM, to transfer the previously evicted data entry from the RAM to one of the local peripheral storage devices without writing the previously evicted data entry as a cache entry in the cache.

There is also provided in accordance with another embodiment of the present disclosure a data communication apparatus, including a network interface including one or more ports for connection to a packet data network and configured to receive content transfer requests from at least one remote device over the packet data network via the one or more ports, a storage sub-system configured to be connected to local peripheral storage devices, and processing circuitry configured to manage transfer of content between the at least one remote device and the local peripheral storage devices, responsively to the content transfer requests, while performing storage sub-system congestion control of the storage sub-system transparently to the storage sub-system.

There is also provided in accordance with still another embodiment of the present disclosure a data communication method, including receiving content transfer requests from at least one remote device over a packet data network, evicting overflow from a cache to a RAM, and managing transfer of content between the at least one remote device and local peripheral storage devices via at least one peripheral interface and the cache, responsively to the content transfer requests, while pacing commencement of serving of respective ones of the content transfer requests responsively to a metric of a storage sub-system including the at least one peripheral interface, the cache and the RAM, so that while ones of the content transfer requests are being served, other ones of the content transfer requests pending serving are queued in at least one pending queue.

There is also provided in accordance with yet another embodiment of the present disclosure a data communication method, including receiving content transfer requests from at least one remote device over a packet data network, and managing transfer of content between the at least one remote device and local peripheral storage devices, responsively to the content transfer requests, while performing storage sub-system congestion control of a storage sub-system transparently to the storage sub-system.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, some data communication devices such as smart NICs (e.g., Mellanox® BlueField®-2 data processing unit) support directly reading or writing to attached local peripheral storage devices (e.g., NVM express (NVMe) drives) via a storage sub-system in response to remote initiator requests (e.g., content transfer requests received from devices over a network to which the data communication device is connected).

Depending on the level of content transfer requests and the speed and bandwidth of the network, storage sub-system interfaces and the local peripheral storage devices, the storage sub-system may suffer from congestion leading to a deterioration in system response to serving the incoming content transfer requests.

For example, the storage sub-system may include a random-access memory (RAM) (e.g., Double Data. Rate (DDR) memory) which is used to transfer content between the data communication device and the local peripheral storage devices, and vice-versa. In some cases, the RAM is not the bottleneck as the local peripheral storage devices are slow. In other cases, where the peripheral storage devices are fast enough (e.g., NVMe drives), the RAM may become the bottleneck as it is slower than the local peripheral storage devices and the network ports serving the initiators of the content transfer requests.

One method to solve this problem is to use a cache (e.g., last level cache (LLC)) in which to copy data between the data communication device and the local peripheral storage devices, and vice-versa. However, if the cache becomes full, cache entries (which still need to be used) may be evicted to the RAM (for example, on a least recently used (LRU) basis). The evicted entries then need to be read from RAM to the cache when necessary leading to a bottleneck. In general, the cache may be selected to service the network bandwidth and if the data communication device is successful in keeping all entries (that need to be used) in the cache then the cache can service the content transfer requests at full wire speed. However, once entries are evicted from the cache to the RAM, a vicious cycle may be formed in which it can take a long time to return to optimal performance where no entries (that need to be used) are evicted from the cache.

Therefore, in some cases, if all received content transfer requests are served, the cache becomes a bottleneck and cache entries (which still need to be used) are evicted to RAM. One solution is to request initiators to refrain from sending content transfer requests. However, this solution is generally not practical as initiators may be from different entities or otherwise non-compliant.

In some scenarios, other interfaces in the storage sub-system, such as PCIe interfaces may become the transfer bottleneck. For example, each NA/Me drive has a given input/output (I/O) rate and given bandwidth limitations. If too many requests are sent to an NA/Me drive, the requests may become out-of-order on the NVMe drive resulting in high latency and degradation in performance. In such a situation, although the PCIe interface may handle the level of requests, the relevant buffers are filled with data which could be better used by another I/O device.

Embodiments of the present invention solve the above problems by providing a data communication apparatus (e.g., NIC or smart NIC) which manages transfer of content between remote device(s) and local peripheral storage devices (e.g., NVMe drives), responsively to content transfer requests received from the remote device(s) (via a network interface), while performing storage sub-system congestion control of the storage sub-system transparently to the storage sub-system. The term "congestion control", as used in the specification and claims, is defined as reducing data being transferred by the storage sub-system to within a given level. The term "transparently to the storage sub-system", as used in the specification and claims, is defined as performing the storage sub-system congestion control by an entity external to the storage sub-system in such a way that the storage sub-system does not need to perform a part of the congestion control and/or does not need to know about the congestion control.

The storage sub-system is connected to the local peripheral storage devices, and may include one or more peripheral interfaces (e.g., PCIe interface(s)) and/or any suitable I/O device, and a memory sub-system including a cache (e.g., LLC) and a RAM (e.g., DDR memory) in which to evict overflow from the cache.

In some embodiments, the congestion control is performed by pacing commencement of serving the content transfer requests responsively to at least one metric of the storage sub-system so that while some content transfer requests are being served, other content transfer requests pending serving are queued in one or more pending queues. The metric(s) may include a data capacity of the cache and/or data-throughput rates of the storage sub-system (e.g., of the peripheral interfaces).

In some embodiments, the pacing is performed responsively to spare data capacity of the cache. For example, if there is spare storage capacity in the cache (e.g., a part of the cache is currently not being used to serve content transfer requests), the space capacity may be used to serve one or more new content transfer requests (depending on the size of the spare capacity). If there is no spare capacity, incoming content transfer requests are queued until space capacity is available.

In some embodiments, pacing may be performed based on data-capacity credits. The credits may be provided according to the size of the cache. For example, if the cache has a size of X which can serve Y simultaneous transfer requests, Y credits are provided. Incoming content transfer requests are queued. When a credit is available, serving a content transfer request from the queue is commenced. The credit is then removed from availability and returned to availability when the content transfer request has completed to be served.

In some embodiments, the credits are assigned to different respective sections of the cache so that when an available credit is used to allow commencement of serving a content transfer request, the cache section associated with that available credit is used to serve that content request.

Although a single pending queue may be provided for queueing content transfer requests pending serving, in some embodiments, multiple pending queues may be used to queue different content transfer requests. For example, the different pending queues may include any one or more of the following: one or more read pending queues, one or more write pending queue, pending queues for different local peripheral storage devices, pending queues for different groups of the local peripheral storage devices, pending queues for different peripheral interfaces, pending queues for different content request attributes such as small/big requests, and/or pending queues for different content request initiators. The available credits are allocated among the different pending queues. For example, if the cache has a size of X which can serve Y simultaneous transfer requests, and two pending queues have been defined (e.g., a read pending queue and a write pending queue) Y credits are allocated among the different pending queues, with A credits for a read queue, and B credits for a write queue, where A plus B is equal to Y.

The initial allocation of the credits among the different queues may be non-optimal. For example, if there are different queues for different local peripheral storage devices, and one or more of the local peripheral storage devices are slower than the other devices, then it may be more efficient to provide less credits to the slower device(s). Other examples may be drives experiencing errors, or drives that are currently not referred to by any of the transfer requests from the initiators. Therefore, in some embodiments, credit usage is occasionally analyzed (for example on a round-robin basis) and the credits are dynamically reallocated among the different pending queues responsively to usage of the credits by the different pending queues. If credits are being used quickly, it is an indication the associated local peripheral storage device(s) are working efficiently and should be assigned more credits than slower local peripheral storage device(s).

Even though using the above method, the cache is managed properly as data should not be evicted to RAM, one or more of the peripheral interfaces may be receiving too many read/write requests and this affects latency and therefore the credits are wasted. Therefore, embodiments of the present invention, pace content transfer requests for any suitable I/O device of the storage sub-system according to the I/O rates of respective I/O devices (e.g., I/O interfaces). Additionally, the wire speed at which data is sent or received by the data communication device provides a maximum limit of the data throughput rate at which data should be transferred over the I/O devices.

The content transfer requests provide an indication of the amount of data to be transferred for the respective requests. The different I/O devices have associated I/O rates. Serving the content transfer requests is paced according to the available I/O capacity of the respective I/O devices and the wire speed. It may be assumed that the cache is designed to handle according to the I/O rates of the different I/O devices and the wire rate and therefore if pacing is performed according to the available I/O rates and wire speed, the cache will not overspill to the RAM.

Therefore, in embodiments of the present invention, the commencement of serving of content transfer requests is performed responsively to the data-throughput rates (e.g., I/O rates) of respective network and peripheral interfaces limited by the maximum rates of those interfaces.

In some embodiments, the pacing is performed based on the availability of the data-throughput rate credits. The data-throughput rate credits may be provided responsively to the data throughput rates of the network interface and peripheral interfaces limited by the maximum rates of those interfaces.

In some embodiments, data-throughput rate credits are assigned to the respective peripheral interfaces so that use of the respective peripheral interfaces is limited to availability of respective data-throughput rate credits. The data-throughput rate credits may be allocated to different pending queues. For example, if there are three peripheral interfaces with data-throughput rates (e.g., I/O rates) of X GB per second, Y GB per second and Z GB per second, and the wire speed is greater than X plus Y plus Z, then content transfer requests may be queued in three respective pending queues for the three peripheral interfaces according to which peripheral interface the content transfer requests should be directed, and the three respective pending queues may be allocated A, B and C credits in proportion to X, Y and Z, respectively. The requests in the pending queues are then served according to the available data-throughput rate credits of the respective pending queues. In some embodiments, each peripheral interface may have one pending queue or more than one pending queue, for example, a read pending queue and a write pending queue, and/or pending queues for different ones or groups of the local peripheral storage devices, and/or pending queues for different content request initiators.

In some embodiments, the data-throughput rate credits are allocated among the different pending queues responsively to usage of the data-throughput rate credits by the different pending queues. For example, some interfaces may be working faster or slower than originally estimated or measured. I/O rates.

By way of example, for an available data throughput rate of 200 Gigabits per second for one or more of the peripheral interfaces 30, allow a total content transfer of 128 Kilobits via the peripheral interface(s) 30 to be executed every 5 microseconds. Therefore, each 5 microseconds, the pending queue is analyzed and content transfer requests requesting in total up to 128 Kilobits of data transfer are commenced to be served. Other requests are left in the pending queue for future serving when a new credit is available in 5 or 10 microseconds for example.

The cache may be implemented according to any suitable caching scheme. In some embodiments, the memory sub-system evicts cache entries to the RAM according to a least recently used (LRU) algorithm wherein a cache entry with a least recently used usage index is first to be evicted from the cache to the RAM by the memory sub-system. When a cache entry is written to the cache, the memory sub-system assigns a most recently used usage index to the written cache entry. Instead of assigning a most recently used usage index to a cache entry which is read from the cache, the memory sub-system does not amend the usage index of the read cache entry thereby ensuring that the read cache entry (which is not needed for a current content transfer request) may be evicted from the cache earlier than if it was assigned a most recently used usage index.

In some embodiments, the memory sub-system amends the usage index of the read cache entry to a less recently used usage index. In some embodiments, in response to the cache entry being read from the cache and the associated transfer request completing, the memory sub-system purges the read cache entry from the cache without writing the read cache entry to the RAM. In some embodiments, the memory sub-system transfers a data entry, previously evicted from the cache, from the RAM to one of the local peripheral storage devices without writing the previously evicted data entry as a cache entry in the cache (and possibly evicting another cache entry).

System Description

Figure 1:
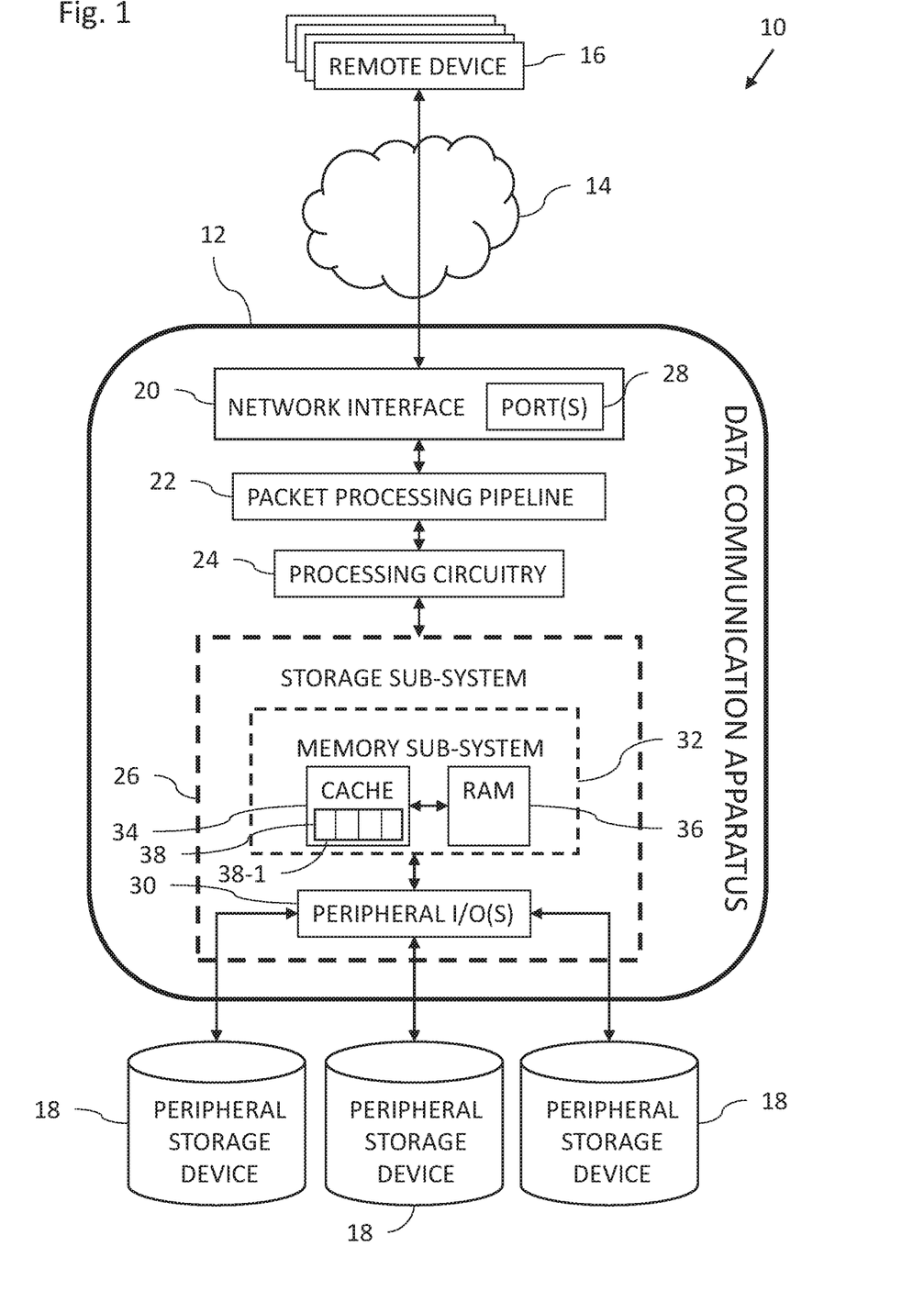
FIG. 1 is a block diagram view of a data communication system constructed and operative in accordance with an embodiment of the present invention.

Reference is now made to FIG. 1, which is a block diagram view of a data communication system 10 constructed and operative in accordance with an embodiment of the present invention. The data communication system 10 includes a data communication apparatus 12, which receives content transfer requests over a packet data network 14 from one or more remote devices 16. The content transfer requests may be RDMA requests by way of example only. In response to the content transfer requests, the data communication apparatus 12 reads data from, and/or writes data to, local peripheral storage devices 18 (e.g., NVMe drives) connected to the data communication apparatus 12. For example, the data communication apparatus 12 is configured to receive data from the remote device(s) 16 to be written to the local peripheral storage device(s) 18 and/or send data read from the local peripheral storage device(s) 18 to the remote device(s) 16.

The data communication apparatus 12 includes a network interface 20, a packet processing pipeline 22, processing circuitry 24, and a storage sub-system 26. The network interface 20 includes one or more ports 28 for connection to the packet data network 14. The packet processing pipeline 22 is configured to process received network packets and to process data for sending in packets over the network 14. The packet processing pipeline 22 may include a PHY chip and a MAC chip, among other components.

The processing circuitry 24 may further process received packet data for example, received content transfer requests. The processing circuitry 24 may comprise one or more processors, for example, tile processors, or an array of ARM processors. The functionality of the processing circuitry 24 is described in more detail with reference to FIGS. 2-9 below.

In practice, some or all of the functions of the processing circuitry 24 may be combined in a single physical component or, alternatively, implemented using multiple physical components. These physical components may comprise hard-wired or programmable devices, or a combination of the two. In some embodiments, at least some of the functions of the processing circuitry 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The storage sub-system 26 includes a memory sub-system 32 and one or more peripheral interfaces 30. The storage sub-system 26 is configured to be connected to the local peripheral storage devices 18 via the peripheral interface(s) 30, for example, Me interfaces. The memory sub-system 32 includes a cache 34 and a random-access memory (RAM) 36, The memory sub-system 32 is configured to evict overflow from the cache 34 to the RAM 36. One method of operating the memory sub-system 32 is described in more detail with reference to FIG. 10. Data is read by the local peripheral storage devices 18 and written by from the local peripheral storage devices 18 via the cache 34 and the peripheral interfaces 30. For example, while serving a particular content transfer request, the data written to, or read from, one of the local peripheral storage devices 18 is transferred via a section 38 of the cache 34. The same section 38 (e.g., the same cache line or same cache lines) of cache 34 may be used to transfer several data chunks associated with the same content transfer request one after the other. For example, a first data chunk of a content transfer request is read from one of the local peripheral storage devices 18 to the section 38-1 of the cache 34, and then copied from the section 38-1 of the cache 34 to the packet processing pipeline 22 for sending over the network 14 to the initiator of the content transfer request, then a second data chunk of that content transfer request is read from the same local peripheral storage devices 18 to the same section 38-1 of the cache 34, and then copied from that section 38-1 of the cache 34 to the packet processing pipeline 22 for sending over the network 14 to the initiator of the content transfer request, and so on. In other embodiments, different sections 38 of the cache 34 may be used to transfer different chunks associated with the same content transfer request.

Figure 2:
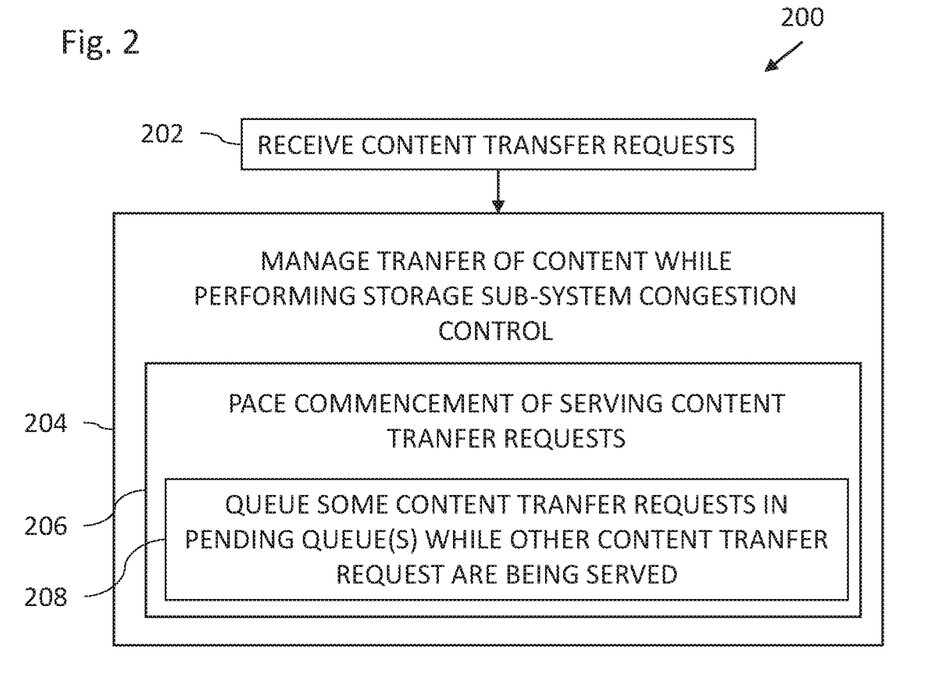
FIG. 2 is a flowchart including steps in a method to provide storage sub-system congestion control in the system of FIG. 1.

Reference is now made to FIG. 2, which is a flowchart 200 including steps in a method to provide storage sub-system congestion control in the system 10 of FIG. 1. Reference is also made to FIG. 1. The network interface 20 is configured to receive (block 202) content transfer requests from the remote device(s) 16 over the packet data network 14 via the one or more ports 28, The content transfer requests are processed by the packet processing pipeline 22 and received by the processing circuitry 24.

The processing circuitry 24 is configured to manage transfer (block 204) of content between the remote device(s) 16 and the local peripheral storage devices 18, responsively to the content transfer requests, while performing storage sub-system congestion control of the storage sub-system 26 transparently to the storage sub-system 26.

In some embodiments, the processing circuitry 24 is configured to manage transfer of content between the remote device(s) 16 and the local peripheral storage devices 18 via the peripheral interface(s) 30 and the cache 34, responsively to the content transfer requests. The step of block 204 is performed while pacing (block 206) commencement of serving the content transfer requests responsively to one or more metrics of the storage sub-system 26 so that while some content transfer requests are being served, other content transfer requests pending serving are queued in at least one pending queue (block 208). The term "commencement of serving", as used in the specification and claims, is defined as the processing circuitry 24 initiating transferring requested data by the storage sub-system 26 in response to one of the content transfer requests so that none of the data requested in that content transfer request in transferred until the commencement of serving of that content transfer request. In other words, initiation of transferring data requested in a content transfer request is performed responsively to the metric(s) of the storage sub-system 26 (e.g., the cache 34 and/or the peripheral interfaces 30). The metric(s) may include a data capacity of the cache 34 and/or data-throughput rates of the storage sub-system 26 (e.g., of the peripheral interfaces 30).

Figure 3:
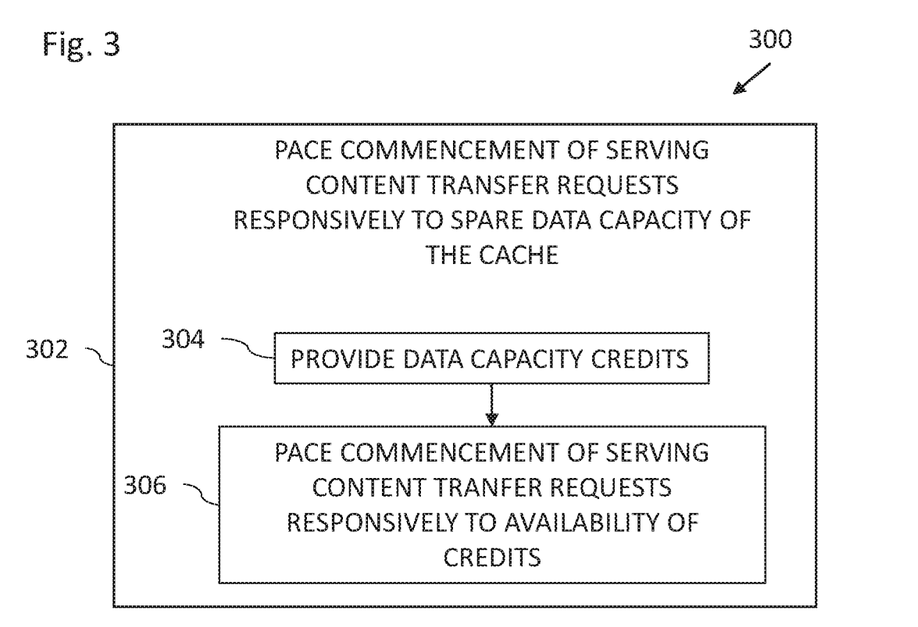
FIG. 3 is a flowchart including steps in a method to perform pacing in the system of FIG. 1.

Reference is now made to FIG. 3, which is a flowchart 300 including steps in a method to perform pacing in the system 10 of FIG. 1. Reference is also made to FIG. 1. The processing circuitry 24 is configured to pace (block 302) the commencement of the serving of respective ones of the content transfer requests responsively to spare data capacity of the cache 34.

The processing circuitry 24 is configured to provide (block 304) data-capacity credits responsively to the size of the cache. For example, if the cache has X sections 38 which may be used for simultaneously serving X respective content transfer requests, then the processing circuitry 24 is configured to provide X data-capacity credits. The step of block 304 is described in more detail with reference to FIG. 5. The processing circuitry 24 is configured to pace (block 306) the commencement of the serving of the respective content transfer requests responsively to availability of the data-capacity credits. The step of block 306 is described in more detail with reference to FIG. 6.

Figure 4:
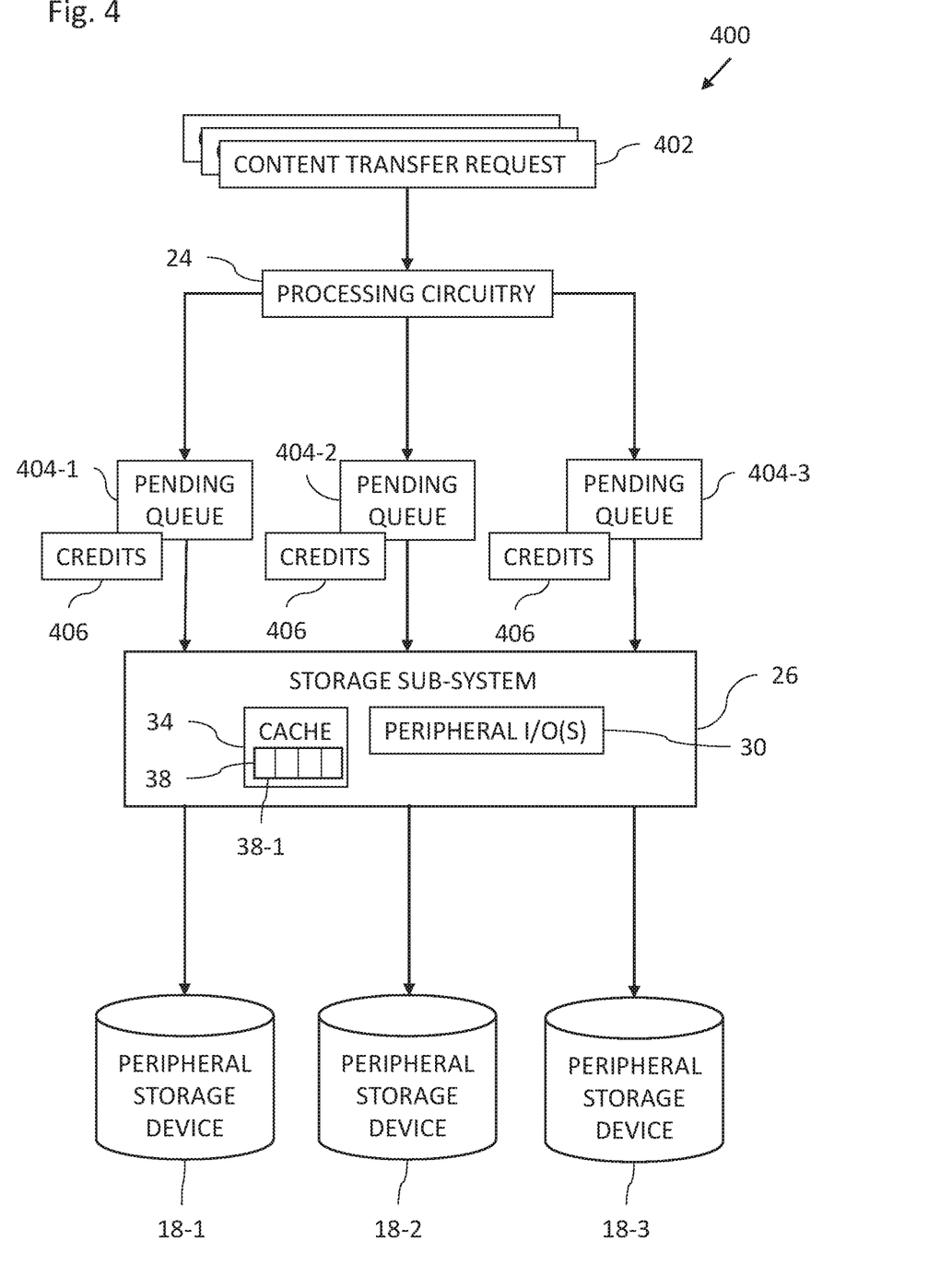
FIG. 4 is a block diagram to illustrate pacing of content transfer requests in the system of FIG. 1.
Figure 5:
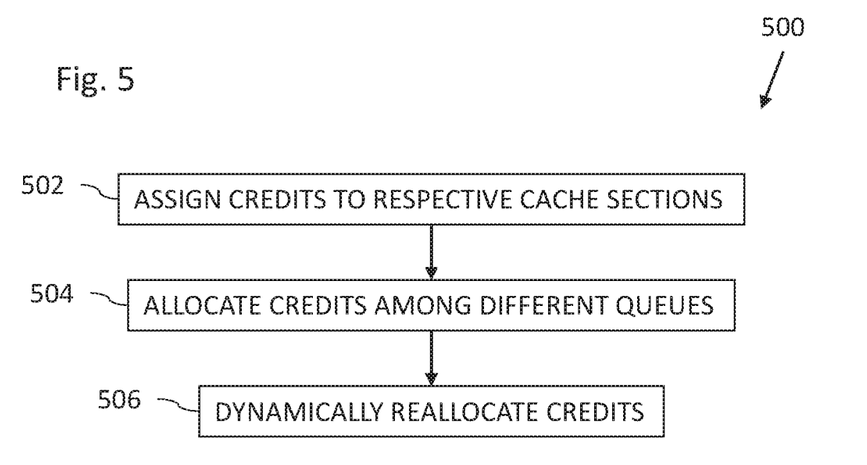
FIG. 5 is a flowchart including steps in a method to provide data-capacity credits in the system of FIG. 1.

Reference is now made to FIGS. 4 and 5. FIG. 4 is a block diagram 400 to illustrate pacing of serving content transfer requests 402 in the system 10 of FIG. 1. FIG. 5 is a flowchart 500 including steps in a method to provide data-capacity credits 406 in the system 10 of FIG. 1.

As previously mentioned, the cache 34 includes respective cache sections 38. The processing circuitry 24 may be configured to assign (block 502) respective data-capacity credits 406 to the respective cache sections 38 so that use of the respective cache sections 38 is limited to availability of the respective data-capacity credits 406. For example, if the cache 34 has n cache sections, e.g., $S_1$ to $S_n$, the processing circuitry 24 assigns n data-capacity credits 406, $C_1$ to $C_n$ corresponding to the n cache sections 38. If the data-capacity credit $C_2$ is available for serving one of the content transfer requests 402, the cache section $S_2$ is then used to serve that request.

In some embodiments, all the content transfer requests are queued in a single pending queue 404 and that queue is assigned all of the available data-capacity credits 406. In some embodiments, there are different pending queues 404 and the processing circuitry 24 is configured to allocate (block 504) the provided data-capacity credits 406 among the different pending queues 404. For example, credits $C_1$ to $C_5$ are allocated to pending queue 404-1, credits $C_6$ to $C_{10}$ are allocated to pending queue 404-2, and credits $C_{11}$ to $C_{15}$ are allocated to pending queue 404-3, The credits may be allocated to the different queues equally or unequally, for example, according to known or expected demand on those queues. FIG. 4 shows three pending queues 404 corresponding to three local peripheral storage devices 18 so that each pending queue 404 services the corresponding local peripheral storage device 18. For example, content service requests 402 for local peripheral storage device 18-1 are queued in pending queue 404-1, content service requests 402 for local peripheral storage device 18-2 are queued in pending queue 404-2, and so on. The credits 406 assigned to pending queue 404-1 are used, when available, by the content transfer requests 402 being queued in the pending queue 404-1, and so on. For example, when one of the content transfer requests 402 which was being queued in pending queue 404-1 is being served, one of the available data-capacity credits 406 allocated to pending queue 404-1 is removed from availability, and is returned to availability for use by the content transfer requests 402 of pending queue 404-1 when the content transfer request 402 has completed to be served, as described in more detail with reference to FIG. 6.

The example, of FIG. 4 shows one pending queue 404 associated with each local peripheral storage device 18. In some embodiments, each of the local peripheral storage devices 18 may be associated with a read and write queue.

The different pending queues 404 may comprises any one or more of the following: a read pending queue and a write pending queue; pending queues for different ones of the local peripheral storage devices 18; pending queues for different groups of the local peripheral storage devices 18; pending queues for different peripheral interfaces 30; pending queues for different content request attributes; or pending queues for different content request initiators.

The initial allocation of the credits 406 among the different queues 404 may be non-optimal. For example, if there are different queues 404 for different local peripheral storage devices 18, and one or more of the local peripheral storage devices 18 are slower than the other devices 18, then it may be more efficient to provide less credits 406 to the slower device(s) 18. Another example may be drives experiencing errors. Therefore, in some embodiments, the processing circuitry 24 is configured to analyze credit usage by the different pending queues 404 (for example on a round-robin basis) and dynamically reallocate (block 506) the data-capacity credits 406 among the different pending queues 404 responsively to usage of the credits 406 by the different pending queues 404, If credits 406 are being used quickly, it is an indication the associated local peripheral storage device(s) 18 are working efficiently and should be assigned more credits 406 than slower local peripheral storage device(s) 18 that are using the credits more slowly.

Figure 6:
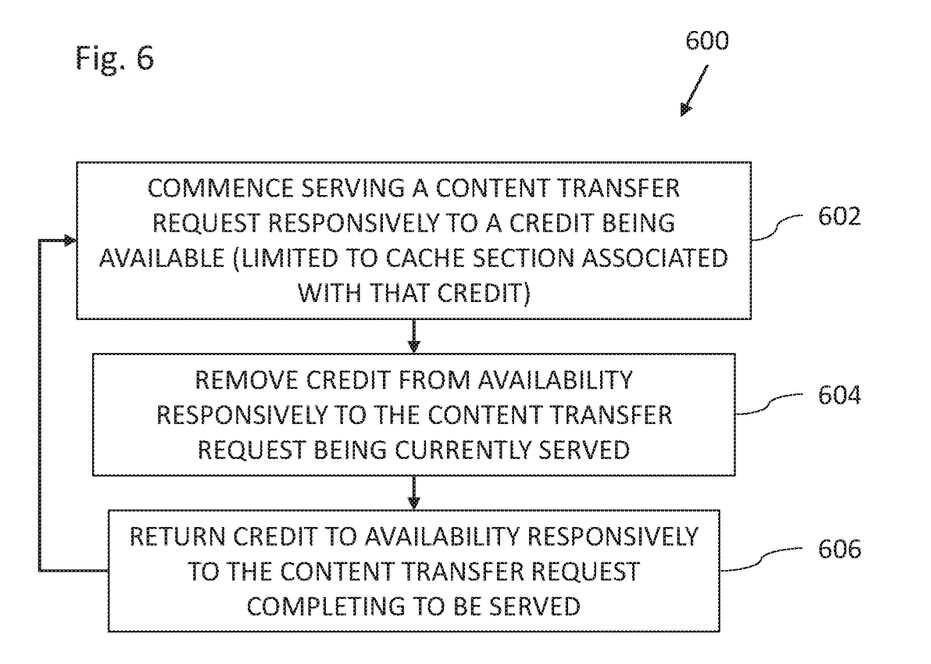
FIG. 6 is a flowchart including steps in a method to perform pacing using data-capacity credits in the system of FIG. 1.

Reference is now made to FIG. 6, which is a flowchart 600 including steps in a method to perform pacing using the data-capacity credits 406 in the system 10 of FIG. 1. Reference is also made to FIG. 4.

The processing circuitry 24 is configured to receive the content transfer requests 402 from the packet processing pipeline 22 (FIG. 1) and assign the content transfer requests 402 to respective pending queues 404 responsively to the content transfer requests 402. For example, a request to read content from, or write content to, the local peripheral storage device 18-1 will be queued in pending queue 404-1, and so on.

The processing circuitry 24 is configured to commence serving (block 602) one of the content transfer requests 402 responsively to one of the data-capacity credits 406 being available (for the pending queue 404 in which that content transfer request 402 is queued). The processing circuitry 24 is configured to remove (block 604) the available data-capacity credit 406 from availability responsively to that content transfer request 402 being currently served. The processing circuitry 24 is configured to return (block 606) the removed data-capacity credit 406 to availability responsively to that content transfer request 402 completing to be served.

Figure 7:
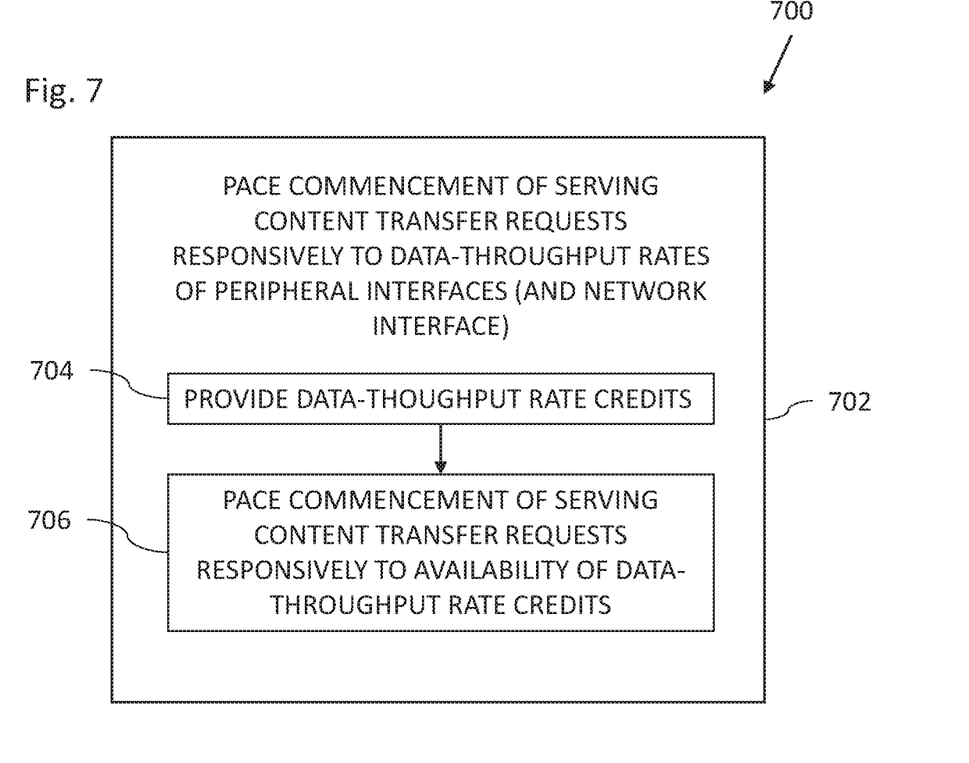
FIG. 7 is a flowchart including steps in a method to perform pacing based on data-throughput rates in the system of FIG. 1.

Reference is now made to FIG. 7, which is a flowchart 700 including steps in a method to perform pacing based on data-throughput rates in the system 10 of FIG. 1, Reference is also made to FIG. 1. The processing circuitry 24 is configured to pace (block 702) the commencement of the serving of respective content transfer requests responsively to the data-throughput rates (e.g., I/O rates) of the respective peripheral interfaces 30 and the network interface 20.

The processing circuitry 24 is configured to provide (block 704) data-throughput rate credits responsively to the data throughput rates of the peripheral interfaces 30 and the wire speed. If the cumulative data throughput rates of the peripheral interfaces 30 are greater than the wire speed, the overall data throughput rate is limited by the wire speed, otherwise the overall data throughput rate is limited by the data throughput rates of the peripheral interfaces 30. The processing circuitry 24 is configured to pace (block 706) the commencement of the serving of the respective content transfer requests responsively to availability of the data-throughput rate credits (per pending queue). For example, every fixed time period a credit (or credits) is allocated to perform an input/output operation of a specific size. In some embodiments, different pending queues may be allocated a different number of credits per fixed time period. In other embodiments, the same number of credits may be assigned to each pending queue. In some embodiments, the fixed time period or the size of the input/output operation may be the same per pending queue or different for different pending queues.

By way of example, using rounded numbers, for an available data throughput rate of 200 Gigabits per second for one or more of the peripheral interfaces 30, allow a total content transfer of 128 Kilobytes via the peripheral interface(s) 30 to be executed every 5 microseconds. Therefore, each microseconds, the pending queue is analyzed and content transfer requests requesting in total up to 128 Kilobytes of data transfer are commenced to be served. Other requests are left in the pending queue for future serving when a new credit is available in 5 or 10 microseconds for example.

For example, if there are three peripheral interfaces 30 with data-throughput rates (e.g., I/O rates) of X GB per second, Y GB per second and Z GB per second, and the wire speed is greater than X plus Y plus Z, then content transfer requests may be queued in three respective pending queues for the three peripheral interfaces 30 according to which respective peripheral interface 30 the content transfer requests should be directed, and the three respective pending queues (of the three peripheral interfaces 30) may be allocated A, B and C credits in proportion to X, Y and X, respectively.

Figure 8:
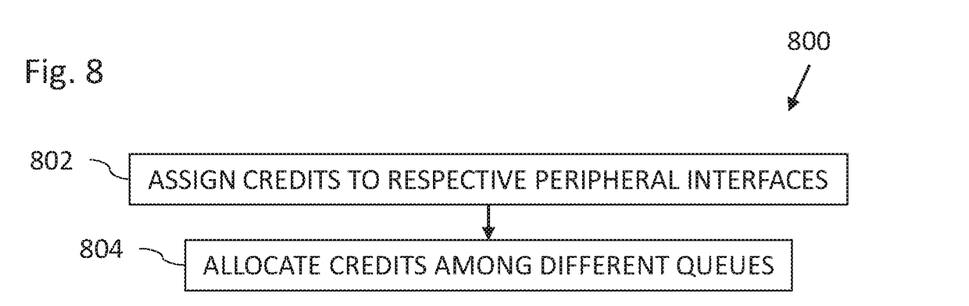
FIG. 8 is a flowchart including steps in a method to provide data-throughput rate credits in the system of FIG. 1.

Reference is now made to FIG. 8 is a flowchart 800 including steps in a method to provide data-throughput rate credits in the system 10 of FIG. 1. Reference is also made to FIG. 1. The processing circuitry 24 is configured to assign (block 802) respective ones of the data-throughput rate credits to the respective peripheral interfaces 30 (intermittently; e.g., periodically) so that use of the respective peripheral interfaces 30 is limited to availability of respective data-throughput rate credits. For example, the data-throughput credits assigned to one of the peripheral interfaces 30 are for use by content transfer requests that will use that peripheral interface to transfer data, and so on. In some embodiments, the data throughput rate credits may be assigned to different groups of peripheral interfaces 30.

In some embodiments, the processing circuitry 24 is configured to allocate (block 804) the provided data-throughput rate credits among the different pending queues (intermittently, e.g., periodically). The different pending queues may comprise any one or more of the following: a read pending queue and a write pending queue; pending queues for different ones of the local peripheral storage devices 18; pending queues for different groups of the local peripheral storage devices 18; pending queues for different ones of the peripheral interfaces 30; pending queues for different content request attributes; or pending queues for different content request initiators. For example, there may be a pending queue for each peripheral interface 30, or a pending read queue and a pending write queue for each peripheral interface 30.

The processing circuitry 24 is configured to analyze usage of the credits by the different pending queues (e.g., on a round-robin basis) and allocate (block 806) the data-throughput rate credits among the different pending queues responsively to the actual rates at which the data associated with the content transfer requests in the pending queues is transferred and other metrics.

The processing circuitry 24 is configured to pace the content transfer requests in accordance with some "pacing rate". The pacing is generally not fixed, and has a feedback that may increase or decrease it. The feedback may be based on different current parameters of the data communication apparatus 12.

In some embodiments, the processing circuitry 24 may measure the actual achieved data-throughput rate of the data communication apparatus 12. If the pacing rate is higher than the measured achieved data-throughput rate, this would lead to an increase of in-flight data and eventually cache evictions and trashing of data. Therefore, the pacing rate is reduced to match the actual measured rate. Nevertheless, the pacing rate is adjusted to try to increase the pacing rate back to the maximum theoretical rate, since the transient effect that made the actual rate lower may have passed.

In other embodiments, the processing circuitry 24 may measure the known in-flight data in the data communication apparatus 12. If the total in-flight data is increasing, it implies that the actual achieved data-throughput rate is lower than the current pacing rate, and therefore the pacing rate is reduced. When total in-flight data in the data communication apparatus 12 is reduced, the pacing rate can be increased again.

Figure 9:
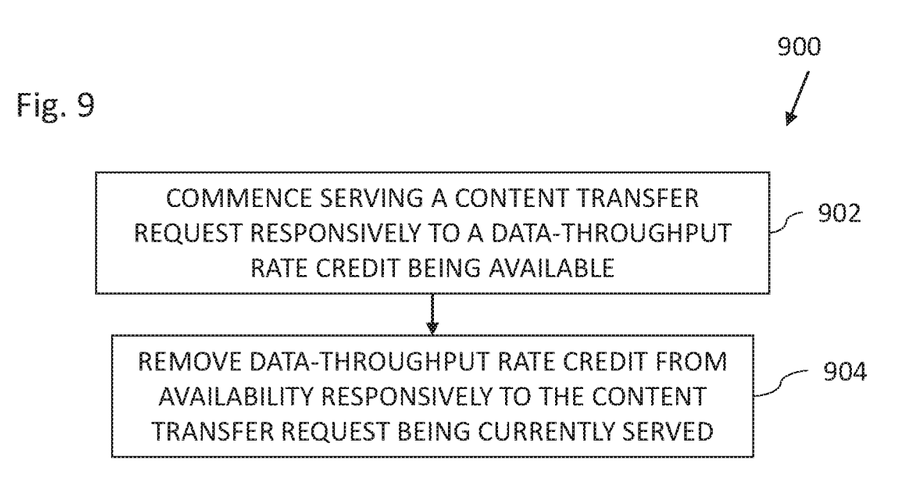
FIG. 9 is a flowchart including steps in a method to perform pacing using data-throughput rate credits in the system of FIG. 1.

Reference is now made to FIG. 9, which is a flowchart 900 including steps in a method to perform pacing using data-throughput rate credits in the system 10 of FIG. 1. The processing circuitry 24 (FIG. 1) is configured to commence serving (block 902) one or more of the content transfer requests responsively to one of the data-throughput rate credits being available (for the pending queue in which that content transfer request is queued). The processing circuitry 24 is configured to remove (block 904) the available data-throughput rate credit from availability responsively to that content transfer request being currently served.

Figure 10:
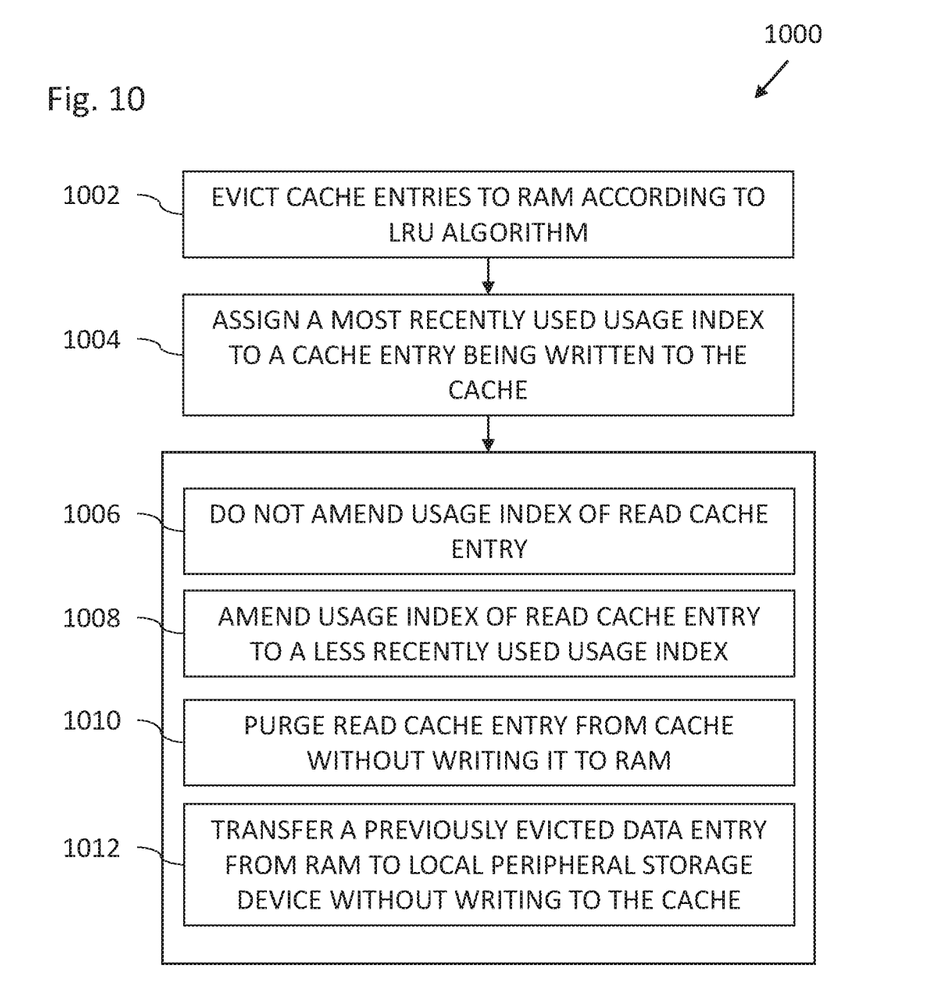
FIG. 10 is a flowchart including steps in a method of cache management in the system of FIG. 1.

Reference is now made to FIG. 10, which is a flowchart 1000 including steps in a method of cache management in the system 10 of FIG. 1. Reference is also made to FIG. 1.

The memory sub-system 32 is configured to evict (block 1002) cache entries to the RAM 36 according to a least recently used (LRU) algorithm wherein a cache entry with a least recently used usage index is first to be evicted from the cache 34 to the RAM 36 by the memory sub-system 32. The memory sub-system 32 is configured responsively to a cache entry being written to the cache 34, to assign (block 1004) a most recently used usage index to the written cache entry.

Instead of assigning a most recently used usage index to a cache entry which is read from the cache, the memory sub-system performs a different step. Different options are described in more detail below with reference to the steps of blocks 1006-1012.

The memory sub-system 32 is configured responsively to a cache entry being read from the cache 34, not to amend (block 1006) a usage index of the read cache entry.

The memory sub-system 32 is configured responsively to a cache entry being read from the cache 34, to amend (block 1008) a usage index of the read cache entry to a less recently used usage index.

The memory sub-system 32 is configured responsively to a message being received from the processing circuitry 24, to purge (block 1010) the read cache entry from the cache 34 without writing the read cache entry to the RAM 36.

The memory sub-system 32 is configured responsively to a previously evicted data entry (which was evicted from the cache 34 to the RAM 36) being read from the RAM 36, to transfer (block 1012) the previously evicted data entry directly from the RAM 36 to one of the local peripheral storage devices 18 without writing the previously evicted data entry as a cache entry in the cache 34.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub combinations of the various features described hereinabove, as well as variations and modifications thereof which would occur to persons skilled in the art upon reading the foregoing description and which are not disclosed in the prior art.

What is claimed is:

1. Data communication apparatus, comprising:
a network interface comprising one or more ports for connection to a packet data network and configured to receive content transfer requests from at least one remote device over the packet data network via the one or more ports;
a storage sub-system configured to be connected to local peripheral storage devices, and comprising at least one peripheral interface, and a memory sub-system comprising a cache and a random-access memory (RAM), the memory sub-system being configured to evict overflow from the cache to the RAM; and
processing circuitry configured to manage transfer of content between the at least one remote device and the local peripheral storage devices via the at least one peripheral interface and the cache, responsively to the content transfer requests, while pacing commencement of serving of respective ones of the content transfer requests responsively to a metric of the storage sub-system so that while ones of the content transfer requests are being served, other ones of the content transfer requests pending serving are queued in at least one pending queue, and wherein the processing circuitry is configured to pace the commencement of the serving of the respective content transfer requests responsively to availability of spare data capacity of the cache.

2. The apparatus according to claim 1, wherein:
the cache has a size; and
the processing circuitry is configured to:
provide data-capacity credits responsively to the size of the cache; and
pace the commencement of the serving of the respective content transfer requests responsively to availability of the data-capacity credits.

3. The apparatus according to claim 2, wherein the processing circuitry is configured to:
commence serving one of the content transfer requests responsively to one of the data-capacity credits being available;
remove the one data-capacity credit from availability responsively to the one content transfer request being currently served; and
return the one data-capacity credit to availability responsively to the one content transfer request completing to be served.

4. The apparatus according to claim 3, wherein:
the cache includes respective cache sections; and
the processing circuitry is configured to assign respective ones of the data-capacity credits to the respective cache sections so that use of the respective cache sections is limited to availability of respective ones of the data-capacity credits.

5. The apparatus according to claim 2, wherein:
the at least one pending queue comprises different pending queues; and
the processing circuitry is configured to allocate the provided data-capacity credits among the different pending queues.

6. The apparatus according to claim 5, wherein the different pending queues comprises any one or more of the following: a read pending queue and a write pending queue; pending queues for different ones of the local peripheral storage devices; pending queues for different groups of the local peripheral storage devices; pending queues for different peripheral interfaces; pending queues for different content request attributes; or pending queues for different content request initiators.

7. The apparatus according to claim 5, wherein the processing circuitry is configured to dynamically reallocate the data-capacity credits among the different pending queues responsively to usage of the data-capacity credits by the different pending queues.

8. The apparatus according to claim 1, wherein the memory sub-system is configured:
to evict cache entries to the RAM according to a least recently used (LRU) algorithm wherein a cache entry with a least recently used usage index is first to be evicted from the cache to the RAM by the memory sub-system;
responsively to a cache entry being written to the cache, to assign a most recently used usage index to the written cache entry; and
responsively to a cache entry being read from the cache, not to amend a usage index of the read cache entry.

9. The apparatus according to claim 1, wherein the memory sub-system is configured:
to evict cache entries to the RAM according to a least recently used (LRU) algorithm wherein a cache entry with a least recently used usage index is first to be evicted from the cache to the RAM by the memory sub-system;
responsively to a cache entry being written to the cache, to assign a most recently used usage index to the written cache entry; and
responsively to a cache entry being read from the cache, to amend a usage index of the read cache entry to a less recently used usage index.

10. The apparatus according to claim 1, wherein the memory sub-system is configured:
to evict cache entries to the RAM according to a least recently used (LRU) algorithm wherein a cache entry with a least recently used usage index is first to be evicted from the cache to the RAM by the memory sub-system;

responsively to a cache entry being written to the cache, to assign a most recently used usage index to the written cache entry; and responsively to a cache entry being read from the cache, to purge the read cache entry from the cache without writing the read cache entry to the RAM.

11. The apparatus according to claim 1, wherein the memory sub-system is configured, responsively to a previously evicted data entry being read from the RAM, to transfer the previously evicted data entry from the RAM to one of the local peripheral storage devices without writing the previously evicted data entry as a cache entry in the cache.

12. Data communication apparatus, comprising:
a network interface comprising one or more ports for connection to a packet data network and configured to receive content transfer requests from at least one remote device over the packet data network via the one or more ports;
a storage sub-system configured to be connected to local peripheral storage devices, and comprising at least one peripheral interface, and a memory sub-system comprising a cache and a random-access memory (RAM), the memory sub-system being configured to evict overflow from the cache to the RAM; and
processing circuitry configured to manage transfer of content between the at least one remote device and the local peripheral storage devices via the at least one peripheral interface and the cache, responsively to the content transfer requests, while pacing commencement of serving of respective ones of the content transfer requests responsively to a metric of the storage sub-system so that while ones of the content transfer requests are being served, other ones of the content transfer requests pending serving are queued in at least one pending queue, and wherein the at least one peripheral interface includes a plurality of peripheral interfaces, the processing circuitry being configured to pace the commencement of the serving of the respective content transfer requests responsively to data-throughput rates of respective ones of the peripheral interfaces.

13. The apparatus according to claim 12, wherein the processing circuitry being configured to pace the commencement of the serving of the respective content transfer requests responsively to the data-throughput rates of the respective one of the peripheral interfaces and the network interface.

14. The apparatus according to claim 12, wherein the processing circuitry is configured to:
provide data-throughput rate credits responsively to the data throughput rates of the peripheral interfaces; and
pace the commencement of the serving of the respective content transfer requests responsively to availability of the data-throughput rate credits.

15. The apparatus according to claim 14, wherein the processing circuitry is configured to:
commence serving one of the content transfer requests responsively to one of the data-throughput rate credits being available; and
remove the one data-throughput rate credit from availability responsively to the one content transfer request being currently served.

16. The apparatus according to claim 15, wherein the processing circuitry is configured to assign respective ones of the data-throughput rate credits to the respective ones of the peripheral interfaces so that use of the respective ones of the peripheral interfaces is limited to availability of respective ones of the data-throughput rate credits.

17. The apparatus according to claim 14, wherein:
the at least one pending queue comprises different pending queues; and
the processing circuitry is configured to allocate the provided data-throughput rate credits among the different pending queues.

18. The apparatus according to claim 17, wherein the different pending queues comprises any one or more of the following: a read pending queue and a write pending queue; pending queues for different ones of the local peripheral storage devices; pending queues for different groups of the local peripheral storage devices; pending queues for different ones of the peripheral interfaces; pending queues for different content request attributes; or pending queues for different content request initiators.

19. The apparatus according to claim 17, wherein the processing circuitry is configured to allocate the data-throughput rate credits among the different pending queues responsively to actual rates at which the data associated with the content transfer requests in the pending queues is transferred.

20. Data communication apparatus, comprising:
a network interface comprising one or more ports for connection to a packet data network and configured to receive content transfer requests from at least one remote device over the packet data network via the one or more ports;
a storage sub-system configured to be connected to local peripheral storage devices; and
processing circuitry configured to:
manage transfer of content between the at least one remote device and the local peripheral storage devices, responsively to the content transfer requests, while performing storage sub-system congestion control of the storage sub-system transparently to the storage sub-system; and
pace commencement of serving the content transfer requests responsively to data-throughput rates of respective peripheral interfaces of the storage sub-system.

21. Data communication method, comprising:
receiving content transfer requests from at least one remote device over a packet data network;
evicting overflow from a cache to a RAM; and
managing transfer of content between the at least one remote device and local peripheral storage devices via at least one peripheral interface and the cache, responsively to the content transfer requests, while pacing commencement of serving of respective ones of the content transfer requests responsively to availability of spare data capacity of a cache of a storage sub-system including the at least one peripheral interface, the cache and the RAM, so that while ones of the content transfer requests are being served, other ones of the content transfer requests pending serving are queued in at least one pending queue.

22. Data communication method, comprising:
receiving content transfer requests from at least one remote device over a packet data network;
managing transfer of content between the at least one remote device and local peripheral storage devices, responsively to the content transfer requests, while performing storage sub-system congestion control of a storage sub-system transparently to the storage sub-system; and pacing commencement of serving the content transfer requests responsively to data-throughput rates of respective peripheral interfaces of the storage sub-system.

23. Data communication method, comprising:

receiving content transfer requests from at least one remote device over a packet data network;

evicting overflow from a cache to a RAM; and managing transfer of content between the at least one remote device and local peripheral storage devices via peripheral interfaces and the cache, responsively to the content transfer requests, while pacing commencement of serving of respective ones of the content transfer requests responsively to data-throughput rates of respective ones of the peripheral interfaces, so that while ones of the content transfer requests are being served, other ones of the content transfer requests pending serving are queued in at least one pending queue.

\* \* \* \* \*